(12) United States Patent
Ladika et al.

(10) Patent No.: US 6,221,976 B1
(45) Date of Patent: Apr. 24, 2001

(54) POLYMERS CONTAINING PARTIALLY NEUTRALIZED SILANOLS

(75) Inventors: Mladen Ladika; Gene D. Rose, both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/237,075

(22) Filed: Jan. 25, 1999

(51) Int. Cl.$^7$ .............................. C08C 19/40; C08F 8/32
(52) U.S. Cl. ............................. 525/374; 528/38; 528/41; 528/30; 528/405; 524/823; 524/822; 525/350; 525/384; 525/386; 526/318.4
(58) Field of Search ................................. 528/38, 41, 30, 528/405; 524/823, 822; 525/350, 374, 384, 386; 526/318.4

(56) References Cited

U.S. PATENT DOCUMENTS

| | | |
|---|---|---|
| 4,340,524 | 7/1982 | Bullman . |
| 4,626,567 | 12/1986 | Chang . |
| 4,849,464 | 7/1989 | Davies et al. . |
| 5,017,632 | 5/1991 | Bredow et al. . |
| 5,141,802 | 8/1992 | Parrinello et al. . |
| 5,370,922 | 12/1994 | Sanborn et al. . |
| 5,426,142 | 6/1995 | Rosano et al. . |
| 5,428,107 | 6/1995 | Tysak et al. . |
| 5,494,975 | 2/1996 | Lavoie et al. . |
| 5,585,407 | 12/1996 | Patel et al. . |
| 6,011,114 * | 1/2000 | Liles et al. ........................ 524/837 |

FOREIGN PATENT DOCUMENTS

| | | | |
|---|---|---|---|
| 33 02 767 A1 | 8/1984 | (DE) | ................ C09D/3/81 |
| 3800311 A1 | 7/1999 | (DE) | ............. C08F/291/00 |
| 0 780 422 A2 | 6/1997 | (EP) . | |
| 743685 | 12/1956 | (GB) | .......................... 2/95 |

OTHER PUBLICATIONS

Chen, Ming J., et al., "Epoxy Silanes in Reactive Polymer Emulsions," Journal of Coatings Technology, vol. 69, No. 875, Dec. 1997.
Chen, Ming J., et al., "Silane curing agents in waterborne coatings," European Coatings Journal, Jul. 8, 1998.
Derwent No. 94–063077/08.
Derwent No. 94–253470/31.
Derwent No. 95–093976/13.
Derwent No. 95–147413/19.
Derwent No. 96–010902/01.
Derwent No. 96–094276/10.
Derwent No. 96–310989/32.
Derwent No. 97–259441/24.

* cited by examiner

*Primary Examiner*—Robert Dawson
*Assistant Examiner*—Kuo-Liang Peng
(74) *Attorney, Agent, or Firm*—Reid S. Willis

(57) ABSTRACT

A shelf-stable water-borne dispersion or solution that cures rapidly and at low temperatures when coated onto a substrate can be prepared with an aqueous-based solution or stable aqueous dispersion of a polymer having a backbone containing pendant silanol groups which are sufficiently neutralized to inhibit silanol condensation.

22 Claims, No Drawings

POLYMERS CONTAINING PARTIALLY NEUTRALIZED SILANOLS

BACKGROUND OF THE INVENTION

The invention relates to polymers containing partially neutralized silanols. Crosslinked water-borne coatings having performance similar to that of solvent-borne coatings are useful for applications including high gloss architectural paint, industrial maintenance coatings, and wood coatings. Of particular interest are formaldehyde-free, single-container water-borne systems that have extended shelf-stability in a wet state, and undergo rapid crosslinking at ambient temperature in a dry coating. See John L. Gardon, "A Perspective on Resins for Aqueous Coatings," Chapter 2, *Technology for Waterborne Coatings*, ACS Symposium Series, No. 663. American Chemical Society, Washington, D.C., pp. 27–43 (1997).

It would be an advantage to prepare a shelf stable aqueous-based dispersion or solutions that cure rapidly and preferably at low temperatures when coated onto a substrate.

SUMMARY OF THE INVENTION

The present invention addresses a need in the art by providing a latent crosslinking composition comprising a shelf-stable aqueous-based solution or dispersion of a polymer having a carbon-containing backbone attached to silanol groups which are sufficiently neutralized to inhibit silanol condensation.

In another aspect, the present invention is a latent crosslinking composition comprising a shelf-stable aqueous-based solution or dispersion of a polymer having a backbone that contains pendant silanol groups which are sufficiently neutralized to inhibit silanol condensation, which silanol groups are connected to the backbone through a secondary amine, an ether, or a sulfide group.

In a third aspect, the present invention is a latent curative comprising a stable aqueous dispersion of a polymer containing pendant partially neutralized silane triol groups prepared by reacting at a pH greater than 5 an alkali metal salt of 3-aminopropyl-silane triol or N-(2-aminoethyl)-3-aminopropyl-silanetriol and a polymer that contains pendant oxirane or enol groups formed from the polymerization of glycidyl methacrylate or acetoacetoxyethyl methacrylate and at least one non-interfering monomer.

The latent curative of the present invention solves a need by providing a shelf-stable, water-borne polymer that cures rapidly when applied as a coating to a substrate.

DETAILED DESCRIPTION OF THE INVENTION

The latent curative of the present invention can be prepared, for example, by reacting a partially neutralized silanol containing a nucleophile with a) an electrophilic polymer; or b) an electrophilic monomer followed by polymerization; or c) an electrophilic compound followed by grafting onto a polymer backbone.

The partially neutralized nucleophilic silanol is either a partially neutralized silanediol or silanetriol, preferably a silanetriol, that contains at least one nucleophile connected to the silanol through a first connecting group. As used herein, the term "partially neutralized" means that at least some of the silanol groups are in the form of mono-, di-, or tribasic alkali metal salts, more particularly lithium, sodium, or potassium salts. The extent of neutralization is that amount sufficient to inhibit condensation of the silanol. The partially neutralized nucleophilic silanol can be represented as follows:

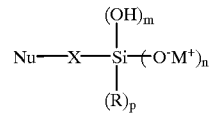

where n is 1, 2, or 3; m is 0, 1, or 2; p is 0 or 1, preferably 0, with the proviso that m+n+p=3; X is the first connecting group; $M^+$ is the alkali metal salt; Nu is the nucleophile; and R is a linear, branched, or cyclic $C_1$–$C_8$-alkyl group, preferably methyl or ethyl, more preferably methyl.

The first connecting group X is preferably a linear, branched, or cyclic alkylene group, or arylene group, or a combination thereof, and may contain one or more heteroatoms, which may themselves be nucleophilic. More preferably, X is a $C_2$–$C_6$-alkylene group or a group of the type —R'—NH—R'—, where each R' is independently a $C_2$–$C_4$-alkylene group.

Examples of suitable nucleophiles include amines, phenols, mercaptans, and carboxylates, with primary and secondary amines and mercaptans being preferred, primary and secondary amines being more preferred, and primary amine being most preferred. The most preferred partially neutralized aminosilanetriols are potassium or sodium salts of 3-aminopropyl-silane triol and N-(2-aminoethyl)-3-aminopropyl-silanetriol.

Though not bound by theory, it is believed that stability of the partially neutralized silanol is enhanced by the presence of a heteroatom that contains a hydrogen atom capable of hydrogen bonding with the partially neutralized silanol.

As used herein, the terms "electrophilic polymer" and "electrophilic monomer" refer to a polymer and a monomer (respectively) that contain electrophilic pendant groups that can react with the partially neutralized nucleophilic silanol to form a chemical bond. Examples of suitable electrophilic pendant groups include oxiranes, benzyl halide, allyl halides, alkyl halides, esters, ethers, and anhydrides. Examples of preferred electrophilic monomers include ethylenically unsaturated compounds such as glycidyl methacrylate, vinyl benzyl halides, and acetoacetoxyethyl methacrylate. In some instances it may be desirable to prepare the electrophilic polymer first, then react the polymer with the nucleophilic silanol. In other cases, it may be desirable to react the electrophilic monomer with the nucleophilic silanol, then polymerize or copolymerize the ethylenically unsaturated partially neutralized silanol. It may also be desirable to graft electrophilic substituents such as maleic anhydride onto a polymer backbone, or to graft a substituent that contains the partially neutralized silanol.

If the polymer containing the partially neutralized pendant silanol groups is prepared by way of an electrophilic polymer, it is preferred that the electrophilic polymer be prepared by copolymerization of an electrophilic monomer and a non-interfering monomer using emulsion polymerization methods well-known in the art. As used herein, the term "non-interfering monomer" is a monomer that does not interfere with the reaction between the electrophile and the nucleophile, and is non-reactive with either the nucleophile or the electrophile.

The preferred concentration of the electrophilic monomer with respect to the non-interfering monomer is generally a balance between an acceptable degree of crosslinking for the desired application and the cost that can be borne by that application. Preferably, the concentration of the electrophilic monomer is not less than 0.1. more preferably not less than 0.5. and most preferably not less than 1 mole percent, and preferably not greater than about 50. more preferably not greater than about 30. and most preferably not greater than about 20 mole percent of the total monomers used to prepare the electrophilic polymer.

Examples of suitable non-interfering monomers include acrylates such as methyl acrylate, ethyl acrylate, butyl acrylate, 2-ethylhexyl acrylate, 2-hydroxyethyl acrylate, 2-hydroxypropyl acrylate, and allyl acrylate; methacrylates such as methyl methacrylate, ethyl methacrylate, butyl methacrylate, allyl methacrylate, 2-hydroxyethyl methacrylate, polypropylene glycol monomethacrylate, and 2-hydroxypropyl methacrylate; and styrene or $C_1$–$C_4$ alkyl- or alkenyl-substituted styrenes, preferably styrene, α-methylstyrene, vinyltoluene, and t-butylstyrene.

The non-interfering monomer may also be cationic or anionic. Examples of suitable cationic monomers include salts of ethylenically unsaturated compounds having quaternary ammonium, cyclic sulfonium, or phosphonium functionality. The salts may be, for example, chloride, bromide, nitrate, phosphate, carbonate, bicarbonate, acrylate, methacrylate, methylsulfate, or sulfate salts. Examples of suitable monomers having quaternary ammonium functionality include ethylenically unsaturated trialkylammonium salts such as vinylbenzyl tri-$C_1$–$C_4$-alkylammonium chloride or bromide; trialkylammoniumalkyl acrylates or methacrylates such as 2-[(methacryloyloxy)ethyl]trimethylammonium chloride and N,N-diethyl-N-methyl-2-[(1-oxo-2-propenyl)oxy]ethanaminium methyl sulfate (Chem. Abstracts Reg. No. 45076-54-8); and trialkylammoniumalkyl acrylamides such as N,N,N-trimethyl-3-[(2-methyl-1-oxo-2-propenyl) amino]-1-propanaminium chloride (Chem. Abstracts Reg. No. 51441-64-6) and N,N-dimethyl-N-[3-[(2-methyl-1-oxo-2-propenyl)armino] propyl]-benzenemethaminium chloride (Chem. Abstracts Reg. No. 122988-32-3). A preferred polymerizable quaternary ammonium salt is 2-[(methacryloyloxy)ethyl]trimethylammonium chloride.

Examples of suitable anionic monomers are alkali metal or ammonium salts of ethylenically unsaturated compounds having strong acid functionality such as salts of sulfonic acid, sulfinic acid, phosphinyl acid, and phosphonic acid.

Examples of polymerizable unsaturated sulfonium salts include dialkylsulfonium salts such as [4-ethoxy-3-(ethoxycarbonyl)-2-methylene-4-oxobutyl]dimethylsulfonium bromide (Chem. Abstracts Reg. No. 63810-34-4); and vinylbenzyl dialkylsulfonium salts such as vinylbenzyl dimethylsulfonium chloride. Examples of polymerizable cyclic sulfonium salts include 1-[4-[(ethenylphenyl)methoxy]phenyl]tetrahydro-2H-thiopyranium chloride (Chem. Abstracts Reg. No. 93926-67-1); and vinylbenzyl tetrahydrothio-phenonium chloride, which can be prepared by the reaction of vinylbenzyl chloride with tetrahydrothiophene.

Examples of polymerizable phosphonium salts include 2-methacryloxyethyltri-$C_{1-C20}$-alkyl-, aralkyl-, or aryl-phosphonium salts such as 2-methacryloxyethyltri-n-octadecylphosphonium halide (Chem. Abstracts Reg. No. 166740-88-1); tri-$C_1$–$C_{18}$-alkyl-, aralkyl-, or aryl-vinylbenzylphosphonium salts such as trioctyl-3-vinylbenzylphosphonium chloride, trioctyl-4-vinylbenzylphosphonium chloride (Chem. Abstracts Reg. No. 15138-12-4), tributyl-3-vinylbenzylphosphonium chloride, tributyl-4-vinylbenzylphosphonium chloride (Chem. Abstracts Reg. No. 149186-03-8), triphenyl-3-vinylbenzylphosphonium chloride, and triphenyl-4-vinylbenzylphosphonium chloride (Chem. Abstracts Reg. No. 145425-78-1); $C_3$–$C_{18}$-alkenyltrialkyl-, aralkyl-, or aryl-phosphonium salts such as 7-octenyltriphenyl-phosphonium bromide (Chem. Abstracts Reg. No. 82667-45-6); and tris(hydroxymethyl)-(1-hydroxy-2-propenyl) phosphonium salts (Chem. Abstracts Reg. No. 73082-48-1).

Examples of ethylenically unsaturated compounds having sulfate or phosphate functionalities include: p-styrene sulfonic acid, 2-acrylamido-2-methyl-1-propane sulfonic acid, 2-sulfoethyl methacrylate, 2-sulfoethyl acrylate, 3-sulfopropyl methacrylate, allylsulfonic acid, 2-methyl-(hydroxyphosphinyl) methyl ester, and vinylphosphonic acid.

The non-interfering monomer may also be an ethylenically unsaturated monomer containing a weak acid group or the salt of a weak acid group, even though such groups can, under certain conditions, act as nucleophiles. Phase separated latex polymerization provides a means of separating carboxylic acid groups from electrophilic groups, thus minimizing their interaction. See John L. Gardon in "A Perspective on Resins for Aqueous Coatings," Chapter 2, *Technology for Waterborne Coatings*, ACS Symposium Series, No. 663. American Chemical Society, Washington, D.C., pp. 27–43, 1997, which teaching is incorporated herein by reference. Alternatively, the partially neutralized nucleophilic silanol can be pre-reacted with the electrophilic monomer to form a partially neutralized silanol monomer, which can then be reacted with the monomer containing the weak acid group or salt thereof at a pH sufficiently basic to inhibit silanol condensation.

Examples of suitable ethylenically unsaturated monomers containing a weak acid group that can be used as comonomers with the electrophilic monomer include acrylic acid, methacrylic acid, itaconic acid, β-carboxyethyl acrylate, and vinylbenzoic acid.

Although the foregoing description refers specifically to the preparation of electrophilic polymers from electrophilic monomers, followed by reaction with the partially neutralized nucleophilic silanol, the teaching also applies to the preparation of polymers from a monomer formed from the reaction of an electrophilic monomer and a partially neutralized nucleophilic silanol.

In a preferred embodiment of the present invention, the partially neutralized silanol, more preferably the partially neutralized silanetriol, is attached to the polymer backbone through a remnant of the nucleophile, preferably a remnant of an amine or a mercaptan. As used herein, the term "remnant of the nucleophile" refers to that which remains of the nucleophile after reaction with the electrophile. Thus, the remnant of a primary amine is a secondary amine, the remnant of a secondary amine is a tertiary amine, and the remnant of a mercaptan is a sulfide. Remnants of other nucleophiles become readily apparent by these examples As used herein, "attached to the polymer through a remnant of the nucleophile" means that the silanol is bonded to the first connecting group X, which is bonded to the remnant of the nucleophile, which is bonded to a second connecting group Y, which is bonded to the polymer backbone, as illustrated:

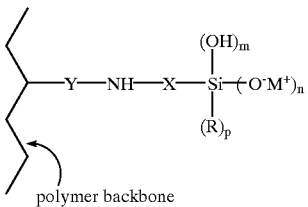

where X, M⁺m, n, and p are as previously defined.

In the preferred embodiment of the present invention, the second connecting group Y is or contains a remnant of the electrophile. As used herein, the term "remnant of the electrophile" refers to that which remains of the electrophile after reaction with the nucleophile. Thus, if the electrophilic polymer contains pendant benzyl halide groups or the electrophilic monomer is a vinyl benzyl halide, Y is a benzylene group, as illustrated.

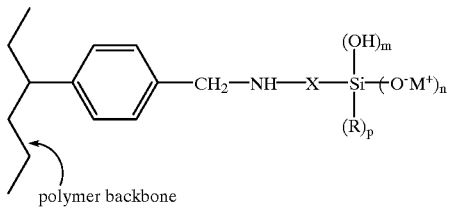

If the electrophilic polymer contains pendant oxirane groups (for example, from the polymerization of glycidyl methacrylate) or the electrophilic monomer is glycidyl methacrylate, a portion of the polymer containing the partially neutralized silanol can be depicted as shown.

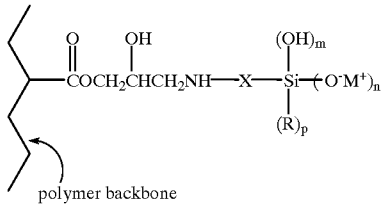

The pH of the solution or stable aqueous dispersion of the polymer that contains partially neutralized silanols is sufficient to inhibit silanol condensation, and is preferably not less than 5, more preferably not less than 7, and most preferably not less than 9. It has been surprisingly discovered that the preferred compositions of the present inventions are shelf stable for at least 6 months, yet rapidly cure at room temperature when applied to a substrate.

The following example is for illustrative purposes only and are not intended to limit the scope of this invention. All percentages or parts are by weight unless otherwise specified.

EXAMPLE 1

Room Temperature Cure of a Latex with the Potassium Salt of 3-Aminopropyl Silanetriol A latex polymer having pendant oxirane groups was prepared by a seeded, continuous addition, emulsion polymerization reaction with butyl acrylate (50 parts), methyl methacrylate (10 parts), styrene (10 parts), and glycidyl methacrylate (3 parts). Trimethylolpropane tris(3-mercaptoproprionate) (5 parts) was added as a chain transfer agent. The $M_w$ and the $M_n$ were determined to be 13,200 and 8,500 respectively by gel permeation chromatography. The latex contained 45.8 percent by weight solids, a $T_g$ of −6° C. (measured by differential scanning calorimetry), a pH of 8.8, and a volume median diameter particle size of 152 nm (measured by hydrodynamic chromatography).

An aqueous solution of a potassium salt of 3-aminopropyl-silanetriol (3-AS) was synthesized in a 1-L round bottom flask equipped with a stirrer. Aqueous KOH (100 mL, 271 mmol KOH) was added to the flask followed by addition with stirring of an aqueous solution of 3-aminopropyltriethoxysilane (water, 240 g; Dow Corning Z-6011, 60 g, 271 mmol of the silane). Upon completion of the addition, the mixture was stirred at room temperature for 24 hours, whereupon the hydrolysis to 3-AS was found to be complete by HPLC analysis. The theoretical concentration of the 3-AS was 11.9 weight percent.

A portion of the 3-AS (0.78 g, 11.9 weight percent in water) was added to a portion of the latex (20.0 g) and left on a shelf for over 6 months. The latex was shelf stable, with no appearance of gellation of the latex. Size exclusion chromatography showed that this silanol modified latex was completely soluble in THF, even after having been stored for 6 months, indicating negligible crosslinking in a wet state over this 6-month period. This observation was supplemented with ²⁹Si NMR spectroscopy, which detected no condensation of the siliconate.

The latex was cast to give a film that was allowed to cure overnight. The resultant cured film did not dissolve in THF in a 24-hour shaking test and showed a gel content of 32 weight percent. These results indicate that the latex was crosslinked with the 3-AS.

What is claimed is:

1. A latent crosslinking composition comprising a shelf-stable aqueous-based solution or dispersion of a polymer having a carbon-containing backbone attached to silanol groups which are sufficiently neutralized to inhibit silanol condensation.

2. The composition of claim 1 wherein the backbone is attached to the silanol groups through a tertiary amine, a secondary amine, or a sulfide group.

3. The composition of claim 2 wherein the silanol is a partially neutralized silanetriol.

4. The composition of claim 3 where the tertiary amine, secondary amine, or sulfide group is connected to the polymer backbone through a remnant of an electrophile, wherein the electrophile is or is prepared from glycidyl methacrylate, a vinylbenzyl halide, or acetoacetoxyethyl methacrylate.

5. The composition of claim 4 which is a stable aqueous dispersion having a pH of not less than 7.

6. The composition of claim 5 which is a stable aqueous dispersion having a pH of not less than 9.

7. The composition of claim 3 wherein the backbone is attached to the silanetriol by way of a secondary amine.

8. The composition of claim 7 wherein the secondary amine is connected to the polymer backbone through a remnant of an electrophile.

9. The composition of claim 8 wherein the electrophile is a benzyl halide, an oxirane, an allyl halide, an alkyl halide, an ester, an ether, or an anhydride.

10. The composition of claim 1 which is prepared by a reaction comprising the step or steps of either:
   a) contacting in the presence of water, a nucleophilic silanol with a solution or dispersion of an electrophilic polymer; or b) contacting in the presence of water, a nucleophilic silanol and an ethylenically unsaturated electrophilic monomer to form an ethylenically unsaturated silanol, then polymerizing or copolymerizing the ethylenically unsaturated silanol;

wherein the nucleophilic silanol is sufficiently neutralized to inhibit condensation.

11. The composition of claim 10 wherein the nucleophilic portion is an amine, an alcohol, a phenol, a mercaptan, a carboxylate, or a combination thereof.

12. The composition of claim 11 wherein the nucleophilic portion is an amine.

13. The composition of claim 11 wherein the electrophile is an oxirane, a benzyl halide, a benzyl quaternary ammonium salt, an allyl halide, an alkyl halide, an ester, an ether, or an anhydride, or a combination thereof.

14. The composition of claim 13 wherein the nucleophilic silanol is an alkali metal salt of an aminosilanetriol.

15. The composition of claim 14 wherein the alkali metal salt of the aminosilanol is a potassium salt of 3-aminopropylsilanetriol or N-(2-aminoethyl)-3-aminopropyl-silanetriol.

16. The composition of claim 14 wherein the alkali metal salt of the aminosilanol is a potassium salt of 3-aminopropylsilanetriol.

17. A latent crosslinking composition comprising a shelf-stable aqueous-based solution or dispersion of a polymer having a backbone that contains silanetriol groups which are sufficiently neutralized to inhibit silanetriol condensation, which silanetriol groups are connected to the backbone through a secondary amine, an ether, or a sulfide group.

18. A latent curative comprising a stable aqueous dispersion of a polymer containing partially neutralized silanetriol groups prepared by reacting at a pH greater than 7, an alkali metal salt of 3-aminopropylsilanetriol or N-(2-aminoethyl)-3-aminopropylsilanetriol and an electrophilic polymer that contains pendant oxirane groups or pendant benzyl halide groups.

19. The curative of claim 18 wherein the electrophilic polymer contains pendant oxirane groups formed from the polymerization of glycidyl methacrylate and at least one non-interfering monomer.

20. A latent crosslinking composition comprising a shelf-stable aqueous-based solution or dispersion of a polymer having a carbon-containing backbone attached to a partially neutralized silanetriol by way of a secondary amine, which secondary amine is attached to the backbone through a remnant of an electrophile, which electrophile is an oxirane or a benzyl halide.

21. The composition of claim 20 that is prepared by contacting in the presence of water, an aminosilanol with a solution or dispersion of an electrophilic polymer formed from the polymerization of glycidyl methacrylate and at least one non-interfering monomer.

22. The composition of claim 21 where the mole percent of structural units of glycidyl methacrylate is 1 to 50 percent based on the total moles of monomers used to prepare the electrophilic polymer.

* * * * *